No. 897,303.
PATENTED SEPT. 1, 1908.
J. R. PEIRCE.
COPING MACHINE.
APPLICATION FILED MAR. 17, 1906.
3 SHEETS—SHEET 1.
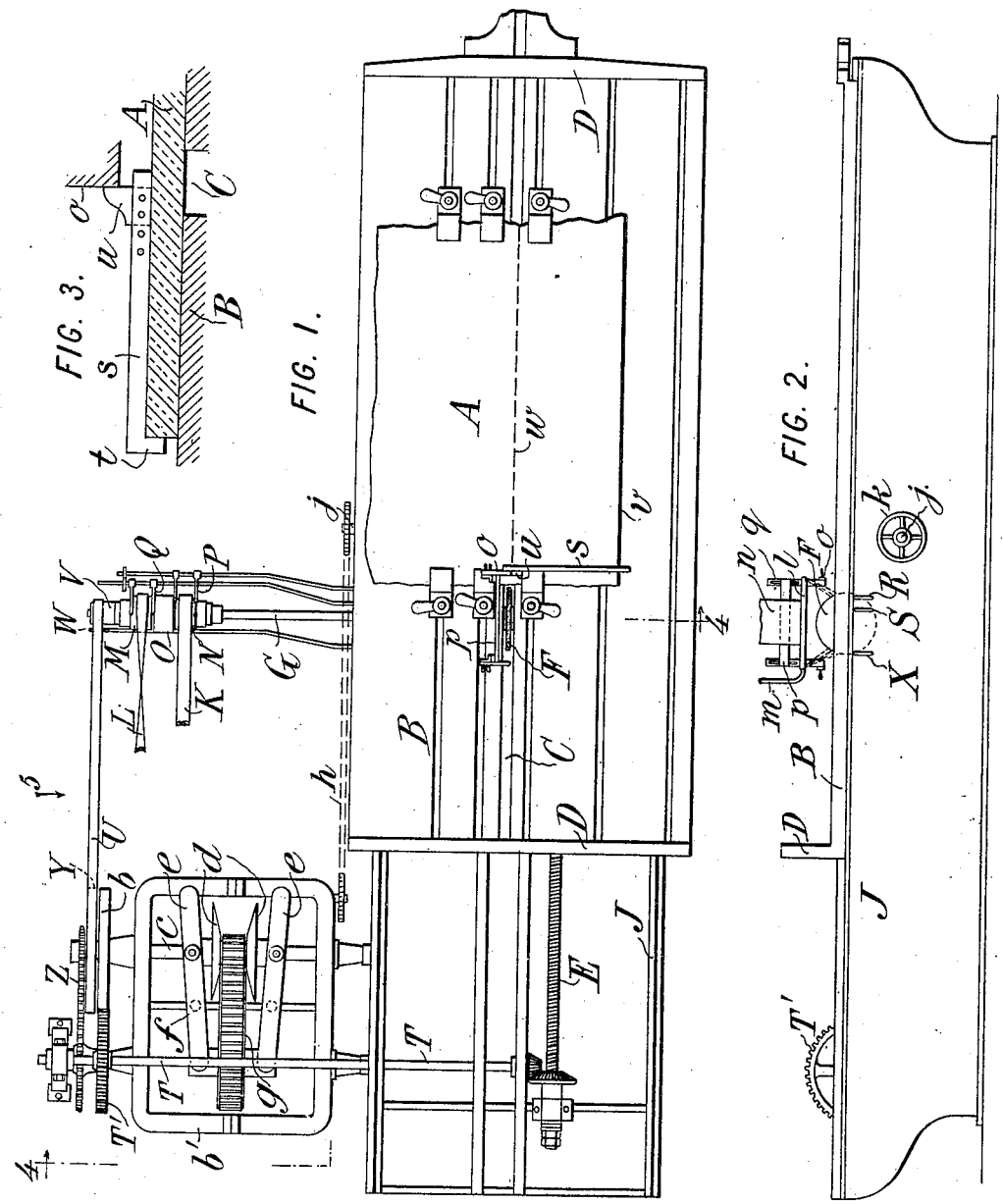
WITNESSES:
INVENTOR:
John Hoyden Peirce,
By Attorneys,

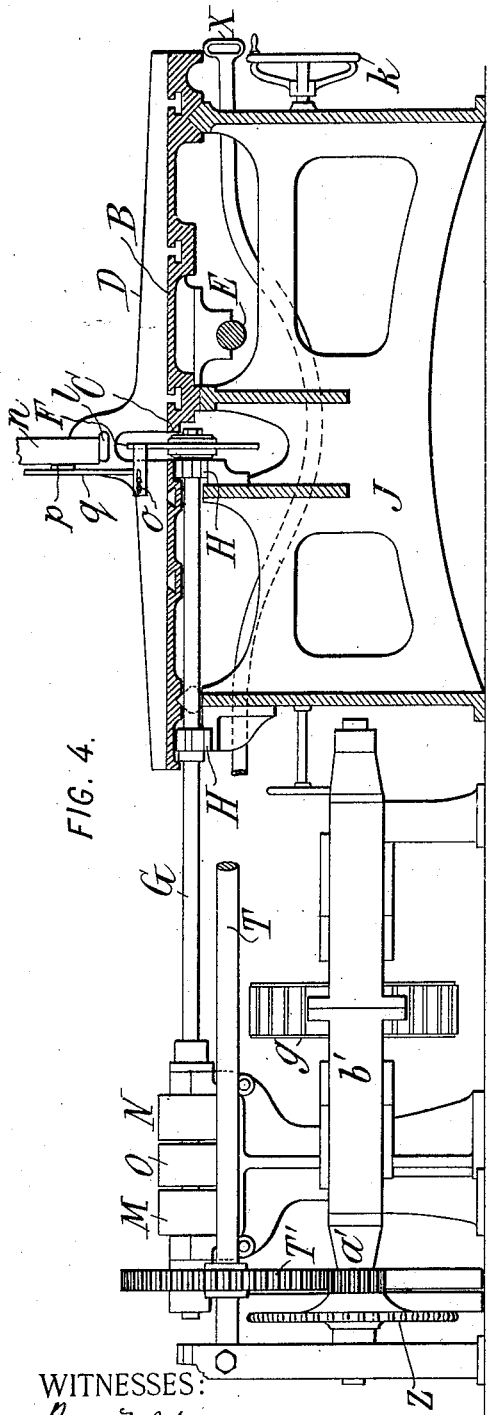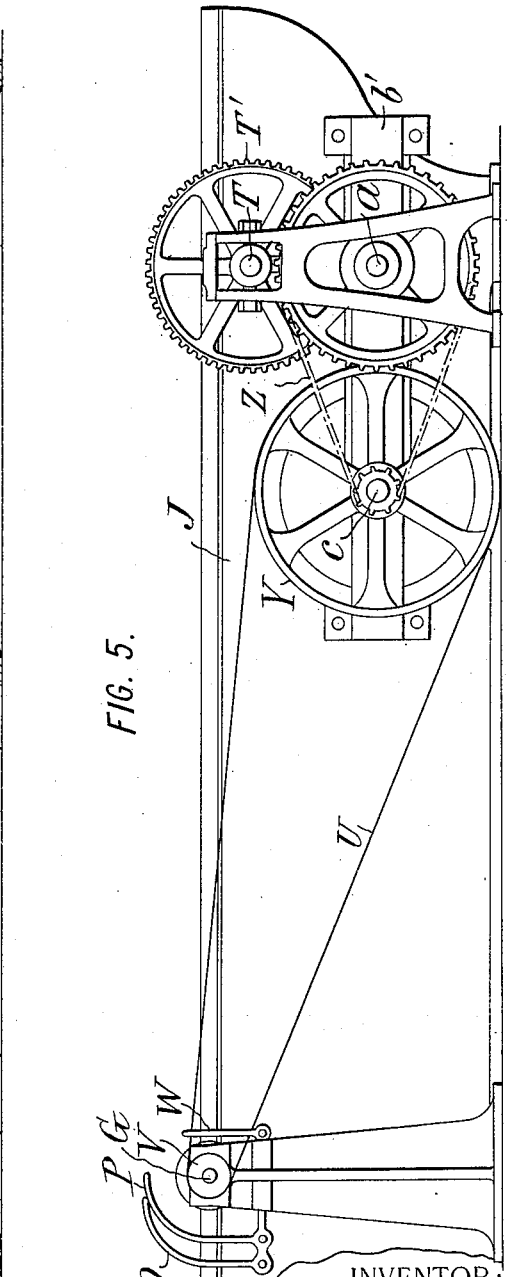

No. 897,303. PATENTED SEPT. 1, 1908.
J. R. PEIRCE.
COPING MACHINE.
APPLICATION FILED MAR. 17, 1906.

3 SHEETS—SHEET 3.

WITNESSES:

INVENTOR:
John Royden Peirce,
By Attorneys,

UNITED STATES PATENT OFFICE.

JOHN ROYDEN PEIRCE, OF NEW YORK, N. Y., ASSIGNOR TO ROYDEN MARBLE MACHINERY COMPANY, OF NEW YORK, N. Y., A CORPORATION OF NEW JERSEY.

COPING-MACHINE.

No. 897,303.     Specification of Letters Patent.     Patented Sept. 1, 1908.

Application filed March 17, 1906. Serial No. 306,557.

*To all whom it may concern:*

Be it known that I, JOHN ROYDEN PEIRCE, a citizen of the United States, residing in the borough of Manhattan, city, county, and State of New York, have invented certain new and useful Improvements in Coping-Machines, of which the following is a specification.

This invention aims to provide an improved machine for coping marble or similar stone, that is to say, for dividing slabs of the stone into regular sizes for wall facing plates, or for base-boards or other uses. In my application for Patent No. 230,863 filed October 31, 1094, I have described a machine for the same purpose in which a thin wheel of carborundum is arranged above the bed of the machine, and is adjustable laterally, said machine being specially adapted to large and heavy slabs which cannot easily be moved about on the table. The present machine operates on the same principle, that is, by the employment of a thin wheel of carborundum cutting the slab of stone in the manner of a circular saw, but has the wheel stationary, being specially designed for smaller slabs of marble which can be freely moved to a desired position relatively to the wheel. The wheel in this case is preferably journaled below and projects above the bed so as to extend entirely through the slab of marble.

The entire machine is extremely simple, the wheel shaft being driven directly by a belt pulley at high speed giving a frictional driving force. Preferably also the machine is capable of cutting equally well in opposite directions, so that a slab may be fed backward and forward to effect the successive cuts, and preferably the means for driving the wheel and for feeding the slab are connected to each other so as to reverse their directions simultaneously and automatically. Certain other improvements are referred to in detail hereinafter.

The accompanying drawings illustrate an embodiment of the invention.

Figure 6:
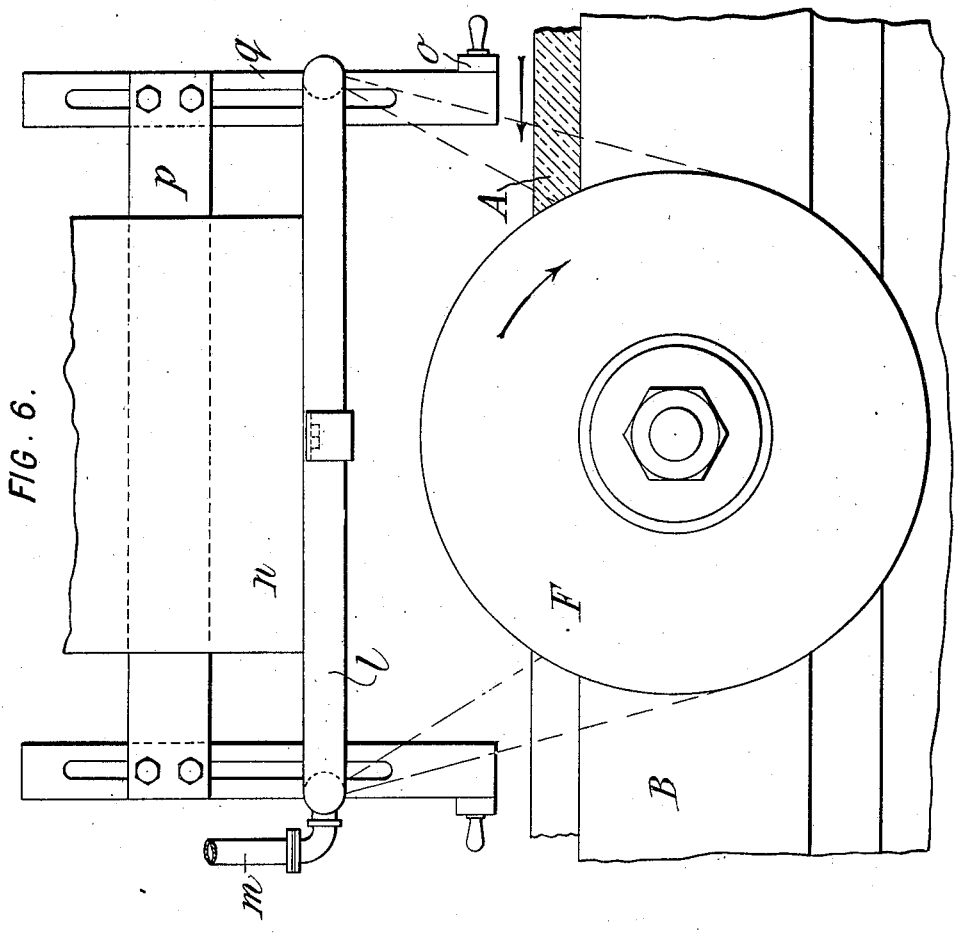
Figure 7:
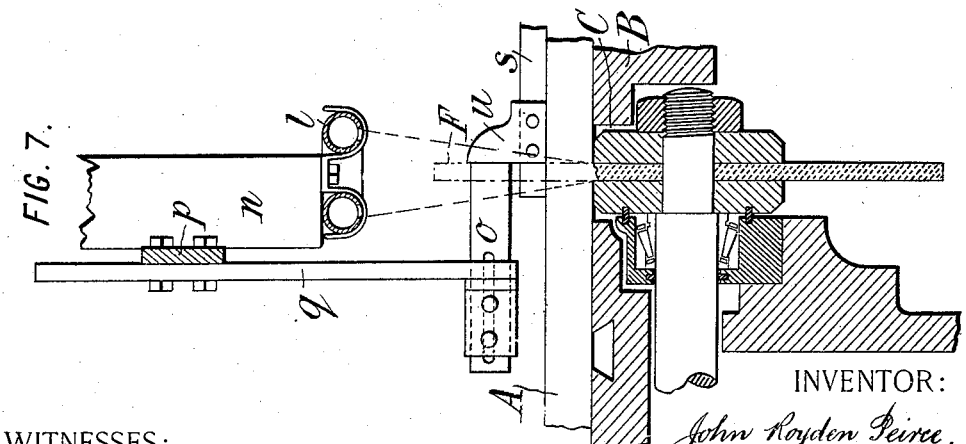

Figure 1 is a plan; Fig. 2 a side elevation; Fig. 3 is a side view of a means for gaging the cut; Fig. 4 is a part end elevation and part cross-section approximately on the line 4—4 in Fig. 1; Fig. 5 is a side elevation of the driving mechanism in the direction of the arrow 5 in Fig. 1; Fig. 6 is a side elevation of the wheel and the immediately adjacent parts; Fig. 7 is a vertical section thereof, the upper part of the wheel being broken away to show the gage beyond.

Referring to the embodiment illustrated, the slab A of marble rests on a bed B having a narrow slit C along the longitudinal center line, the two parts being held together by arches or cross bars D at the ends and the entire bed being reciprocated by means of a shaft E engaging brackets on the under side of the bed. The cutting wheel F is a thin disk of carborundum projecting upward through the central slit C and carried on a shaft G mounted in bearings H carried upon the fixed frame or base J. The wheel in operation projects entirely through the slab A and cuts the same just as a circular saw would cut through a plank of wood. The use of a disk of carborundum in this way is covered broadly in my previous application above referred to.

The driving apparatus is of the very simplest. The wheel must rotate at a very high speed, approximately a mile a minute of peripheral velocity, and there is no need of varying this speed. The pressure necessary is comparatively slight. Under these circumstances a comparatively small shaft G suffices, and may be driven directly from overhead belting. Two belts, K and L, running in opposite directions, are used in connection with loose pulleys M and N and an intermediate driving pulley O, belt shifters P being used for the belt K and shifters Q being used for the belt L, the handles of these belt shifters being shown at R and S at the front of the machine (Fig. 2).

The rotation of the feeding shaft E is effected from a transverse shaft T, which is driven through suitable intermediate change speed gearing by a belt U running on a pulley V on the end of the wheel-shaft G. The belt U is under control of a shifter W having a handle X at the front of the machine adjacent to the handles R and S. The belt U is driven at continuous speed from the pulley V. It is necessary, however, to run slowly at the end of a cut in order to finish the edge cleanly. For this purpose the belt U when it is in the position shown in Fig. 1, runs over a loose pulley Y carrying a sprocket which drives a chain Z (Figs. 1 4 and 5), which in turn drives a sprocket on a shaft a, which by a pinion a' and gear T' operate the shaft T at a gradually reduced speed. By means of the shifter W, however, the belt U may be thrown on a pulley $b$ which drives the shaft T through any suitable intermediate gearing, such for example as the Reeves gearing shown within the frame $b'$. This is a well known mechanism. The shaft $c$ of the pulley $b$ carries a pair of cone-pulleys $d$ which slide on the shaft $c$, and which are drawn together or separated by a suitable movement of the levers $e$ which are pivoted at $f$. A similar pair of cone pulleys are carried on the shaft $a$, the latter pulleys being connected to the former by a chain or link belt $g$. As the cone pulleys on the shaft $c$ are brought together, the corresponding pulleys of the shaft $a$ are separated. Consequently the ratio of transmission between $c$ and $a$ is varied. This capability of variation is important to enable the machine to handle marbles which vary very greatly in their hardness or in their irregularity. Great care and watchfulness on the part of the operator is necessary with some very irregular marbles, and this change speed gearing gives a very good control of the speed and the pressure of the marble on the cutting wheel. The levers $e$ of the Reeves mechanism are controlled by a threaded shaft as usual, the end of which is connected by a sprocket chain $h$ to a shaft $j$ having a hand-wheel $k$ projecting at the front of the machine adjacent to the handles R, S and X of the several belt shifters.

It will be observed that the belt shifters and the change speed gearing are all equally and easily controllable by an operator standing in a fixed position at the front of the machine. When the wheel is approaching the end of a cut, the operator pushes the handle X to throw the belt U to the position shown in Fig. 1, so that the feed continues at an extremely slow rate. When a cut is completed, the slab is shifted to the position necessary for the next cut, and the levers R and S are shifted to rotate the wheel in the opposite direction. This movement automatically starts the feed in the opposite direction, and the wheel enters the marble slowly. By means of the handle X the belt U is then shifted to the pulley $b$, and the hand-wheel $k$ is turned in the desired direction to gradually increase the speed to that which the marble will safely stand.

When the marble is being fed in the direction indicated in Fig. 6, the wheel is preferably rotated as indicated by the arrow so as to press downward at the cutting point. When the feed of the marble is reversed the direction of rotation of the wheel is also reversed to have the same effect.

It is highly important that water should not only be applied in considerable volume, but that it should be applied immediately at the point where the cutting occurs, that is to say between the wheel and the marble, so as to avoid the burning of the marble and the consequent spoiling of the edge. The fact that the total pressure is upon a comparatively slight area, the wheel passing through the marble in a direction nearly perpendicular to the face instead of nearly parallel thereto as in my previous machine, increases the unit pressure or pressure per square inch, and the consequent friction at this point. There is also a certain degree of engagement of the sides of the wheel with the cut edges of the slab. I provide most effectively for cooling the marble at all these points by applying a jet to both edges and to both faces of the wheel, so that the water will be carried down with the wheel into the area of engagement with the marble, the jets being arranged to converge at approximately the point where the wheel enters the marble. I have found in practice that this arrangement is very efficient, and permits a very rapid rate of work. These jets may be directed for example from an oblong pipe $l$ supported immediately above the wheel and extending slightly beyond the ends and sides of the wheel in the manner of a halo, the water being conducted from a pipe or hose $m$ or other suitable source. The pipe $l$ may be supported for example from a hanger $n$ depending from overhead. The wheel being continuously surrounded by a cloud of spray, and it being more or less dangerous and inconvenient for the workmen to bring the marble directly to the wheel, I provide a gage whereby the workmen can locate the slab properly on the bed in order to cut along a desired line. The gage is preferably duplicated at opposite sides of the wheel so as to be slightly in advance thereof in feeding the slab to the wheel from either side. It is also above the marble and clear of the table, so as to avoid interference. It consists of a stop fixed above and slightly in advance of the wheel, so that it may be engaged by a suitable upwardly projecting standard located at a determined distance from the edge of the stone.

As illustrated, there are two gages $o$ supported from a cross-bar $p$, which may be suspended by the hanger $n$ depending from overhead. Uprights $q$ are fastened adjustably to the cross-bar $p$, so that the elevation of the gages $o$ may be varied. The gages $o$ are supported upon the lower ends of the uprights $q$, and are adjusted horizontally until their faces are brought against a straight edge laid along the proper face of the wheel F. A measuring tool $s$ has a downwardly bent end $t$ adapted to engage the finished edge of the marble, and an upwardly projecting stop $u$ adjustable along the measuring tool to correspond with any desired width of slab. The marble being brought to approximately the position shown in Fig. 1, the measuring tool $s$ is laid along the previously cut edge $v$, and the marble shifted until the projection $u$ engages the face of the gage $o$. This determines the width of the slab, which will be cut with perfect accuracy and with great rapidity along the line $w$.

Though I have described with great particularity of detail a certain specific embodiment of my invention, yet it is not to be understood therefrom that the invention is limited to the specific embodiment disclosed. Various modifications in detail and in the arrangement and combination of the parts, may be made by those skilled in the art, without departure from the invention.

I make no claim herein to the gages and measuring tool above described, these being of general application, and being described and claimed in my application for Patent No. 313,584, filed April 25, 1906.

What I claim is:—

1. A machine for coping marble comprising in combination a bed B, a thin wheel F of carborundum journaled below and projecting above the bed and adapted to extend through a slab of marble on said bed, a shaft G carrying said wheel, pulleys M, N and O on said shaft, belts K and L adapted to drive in opposite directions, and belt shifters P and Q operable from the front of the machine, whereby the shaft G may be driven directly by a belt at high speed and with a frictional driving force and in either of two directions, and means for moving said bed in the direction of the plane of the wheel, whereby the wheel cuts through the slab substantially in the manner of a circular saw.

2. A machine for coping marble, comprising in combination a thin wheel F of carborundum, a bed B for carrying a slab of marble and feeding it to said wheel, a shaft G carrying said wheel, belt pulleys for driving said shaft in opposite directions directly from a belt at high speed and with a frictional driving force, a shaft E for moving said bed, mechanism for driving said shafts simultaneously, means for reversing the directions of said shafts, and means for varying the speed of movement of the bed.

In witness whereof, I have hereunto signed my name in the presence of two subscribing witnesses.

JOHN ROYDEN PEIRCE.

Witnesses:
    D. ANTHONY USINA,
    FRED WHITE.